(12) United States Patent
Fowler

(10) Patent No.: US 11,710,197 B2
(45) Date of Patent: Jul. 25, 2023

(54) ADAPTIVE POWER MANAGEMENT RECOGNITION AND ASSIGNMENT SYSTEM

(71) Applicant: Siemens Energy Global GmbH & Co. KG, Munich (DE)

(72) Inventor: Edward A. Fowler, Houston, TX (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 369 days.

(21) Appl. No.: 16/961,541

(22) PCT Filed: Jan. 12, 2018

(86) PCT No.: PCT/US2018/013436
§ 371 (c)(1),
(2) Date: Jul. 10, 2020

(87) PCT Pub. No.: WO2019/139602
PCT Pub. Date: Jul. 18, 2019

(65) Prior Publication Data
US 2021/0373517 A1 Dec. 2, 2021

(51) Int. Cl.
*F04D 13/06* (2006.01)
*G05B 19/042* (2006.01)
(Continued)

(52) U.S. Cl.
CPC ............. *G06Q 50/06* (2013.01); *F04D 13/06* (2013.01); *F04D 13/14* (2013.01);
(Continued)

(58) Field of Classification Search
CPC .... G06Q 50/06; H02J 13/00002; H02J 3/007; H02J 13/00034; H02J 3/0075;
(Continued)

(56) References Cited

U.S. PATENT DOCUMENTS

2011/0208367 A1 8/2011 Sackman et al.
2012/0078424 A1* 3/2012 Raghavachari ........ G05B 15/02
700/282

(Continued)

FOREIGN PATENT DOCUMENTS

DE 112016000102 T5 5/2017

OTHER PUBLICATIONS

PCT International Search Report and Written Opinion of International Searching Authority dated Sep. 28, 2018 corresponding to PCT International Application No. PCT/US2018/013436 filed Jan. 12, 2018.

*Primary Examiner* — Thomas C Lee
*Assistant Examiner* — Ameir Myers

(57) ABSTRACT

A method and controller for controlling electrical activation of elements in a system. A method includes identifying (710) a first element (102) of a system (100) by a control system (600), among a plurality of elements (102, 110, 122) of the system (100), that is to be powered. The method includes determining (712) connected elements (110, 122) of the system (100) by the control system (600). The connected elements (110, 122) are connected to deliver power to the first element (102) directly or indirectly, based on an adjacency matrix (400), and the adjacency matrix (400) identifies connections between each of plurality of elements of the system (100). The method includes identifying (714) at least one of the connected elements (110, 122) to activate by the control system (600), based on the adjacency matrix (400), a health table (500), and the connected elements (110, 122), to deliver power to the first element (102). The method includes activating (716) the at least one of the connected elements (110, 122) by the control system (600), thereby delivering power to the first element (102).

15 Claims, 9 Drawing Sheets

(51) Int. Cl.
  *H02J 13/00*   (2006.01)
  *G07C 3/00*    (2006.01)
  *G06Q 50/06*   (2012.01)
  *F04D 13/14*   (2006.01)
  *F04D 15/00*   (2006.01)
  *H02J 3/00*    (2006.01)
  *F17D 5/00*    (2006.01)

(52) U.S. Cl.
  CPC ....... *F04D 15/0088* (2013.01); *G05B 19/042* (2013.01); *H02J 3/007* (2020.01); *H02J 3/0075* (2020.01); *H02J 13/00002* (2020.01); *H02J 13/00034* (2020.01); *F17D 5/00* (2013.01); *G05B 2219/2639* (2013.01); *G07C 3/00* (2013.01); *H02J 2203/20* (2020.01)

(58) Field of Classification Search
  CPC ...... H02J 2203/20; F04D 13/06; F04D 13/14; F04D 15/0088; G05B 19/042; G05B 2219/2639; F17D 5/00; G07C 3/00
  See application file for complete search history.

(56) References Cited

U.S. PATENT DOCUMENTS

| | | |
|---|---|---|
| 2012/0158195 A1 | 6/2012 | Kim et al. |
| 2013/0017098 A1* | 1/2013 | Kallesoe ............ F04D 13/0686 417/44.1 |
| 2013/0346057 A1 | 12/2013 | Lin et al. |
| 2015/0212534 A1 | 7/2015 | Huang et al. |
| 2017/0030359 A1 | 2/2017 | Fowler et al. |
| 2019/0236219 A1* | 8/2019 | Schumacher ........... G06F 30/20 |
| 2019/0323720 A1* | 10/2019 | Challa ..................... F24F 11/62 |

\* cited by examiner

FIG. 5

500 → HEALTH TABLE

| | POWER STATUS | OPERATIONAL STATUS | LOAD (kW) |
|---|---|---|---|
| UTIL | 1 | 1 | 20.3 |
| CB | 1 | 0 | 20.3 |
| IC | 1 | 1 | 5.4 |
| VSD | 1 | 1 | 5.4 |
| OC | 1 | 1 | 5.3 |
| VCM1 | 1 | 1 | 5.3 |
| BCM1 | 0 | 0 | 0 |
| M1 | 1 | 1 | 5.3 |
| VCM2 | 0 | 0 | 0 |
| BCM2 | 1 | 1 | 5.9 |
| M2 | 1 | 1 | 5.9 |
| VCM3 | 0 | 0 | 0 |
| BCM3 | 0 | 0 | 0 |
| M3 | 0 | 0 | 0 |

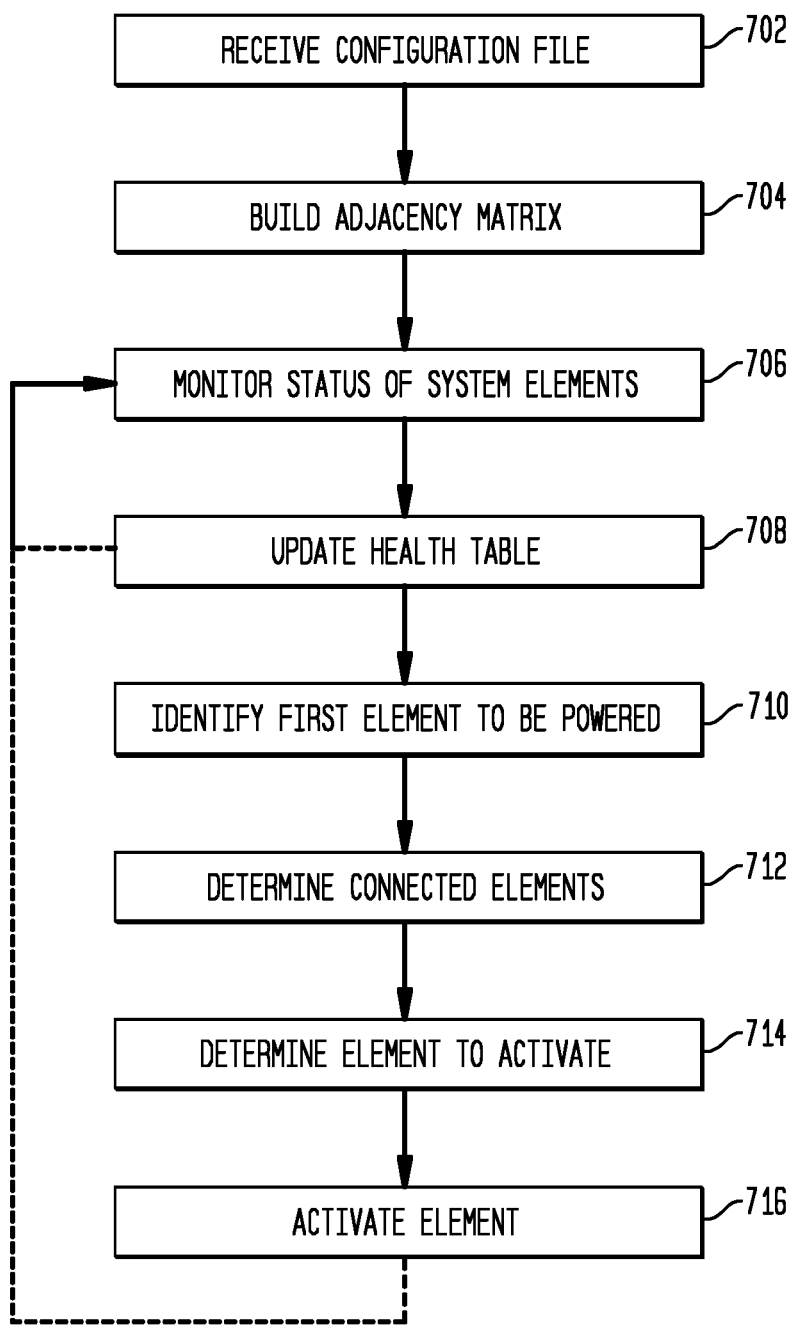

ADAPTIVE POWER MANAGEMENT RECOGNITION AND ASSIGNMENT SYSTEM

TECHNICAL FIELD

The present disclosure is directed, in general, to electrical power or other configuration systems for use in pumping systems and other systems.

BACKGROUND OF THE DISCLOSURE

Ad-hoc configuration of electrical systems in large installations can be difficult and time consuming. Improved systems are desirable.

SUMMARY OF THE DISCLOSURE

Various disclosed embodiments include a method and controller for controlling electrical activation of elements in a system. A method includes identifying a first element of a system by a control system, among a plurality of elements of the system, that is to be powered. The method includes determining connected elements of the system by the control system. The connected elements are elements connected to deliver power to the first element directly or indirectly, based on an adjacency matrix. The adjacency matrix identifies connections between each of plurality of elements of the system. The method includes identifying at least one of the connected elements to activate by the control system, based on the adjacency matrix, a health table, and the connected elements, to deliver power to the first element. The method includes activating the at least one of the connected elements by the control system, thereby delivering power to the first element.

In various embodiments, the method also includes receiving a configuration file that defines the plurality of elements of the system and connections between the plurality of elements, and building the adjacency matrix according to the configuration file, wherein each cell of the adjacency matrix identifies whether a respective two of the plurality of elements of the system are connected to each other. In various embodiments, one or more cells of the adjacency matrix includes a variable dependent on the status of another element. In various embodiments, the method also includes monitoring the status of each of the plurality of elements, and updating the health table based on the status of each of the plurality of elements, wherein the status includes whether each element is currently powered. In various embodiments, monitoring the status of each of the plurality of elements and updating the health table is performed repeatedly. In various embodiments, determining connected elements of the system by the control system includes determining elements of the system that are indirectly connected to the first element by calculating matrix powers $A^1$-$A^N$ of the adjacency matrix, wherein A represents the adjacency matrix and N is the number of the plurality of elements. In various embodiments, identifying at least one of the connected elements to activate by the control system includes, identifying a connected element that has power according to the health table, and finding a path through the elements from the connected element to the first element. In various embodiments, the system is a pumping station. In various embodiments, the first element is a pump in a pumping station. In various embodiments, the first element is identified by receiving a user input of the first element.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5 illustrates a health table corresponding to the diagram of FIG. 2A and the adjacency matrix of FIG. 3;

FIG. 7 illustrates a process in accordance with disclosed embodiments.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Most projects with power supplies, including power generation, distribution, switch boards, motors, etc., include multiple pieces of equipment that can be powered or driven from multiple sources. Typical systems require custom programming for monitoring and control. Such programming is difficult and time intensive, and can lead to less-than-optimal configuration.

Disclosed embodiments include systems and methods that are completely configurable and can be applied to many different system eliminating hundreds of engineering hours from project to project.

Figure 1:
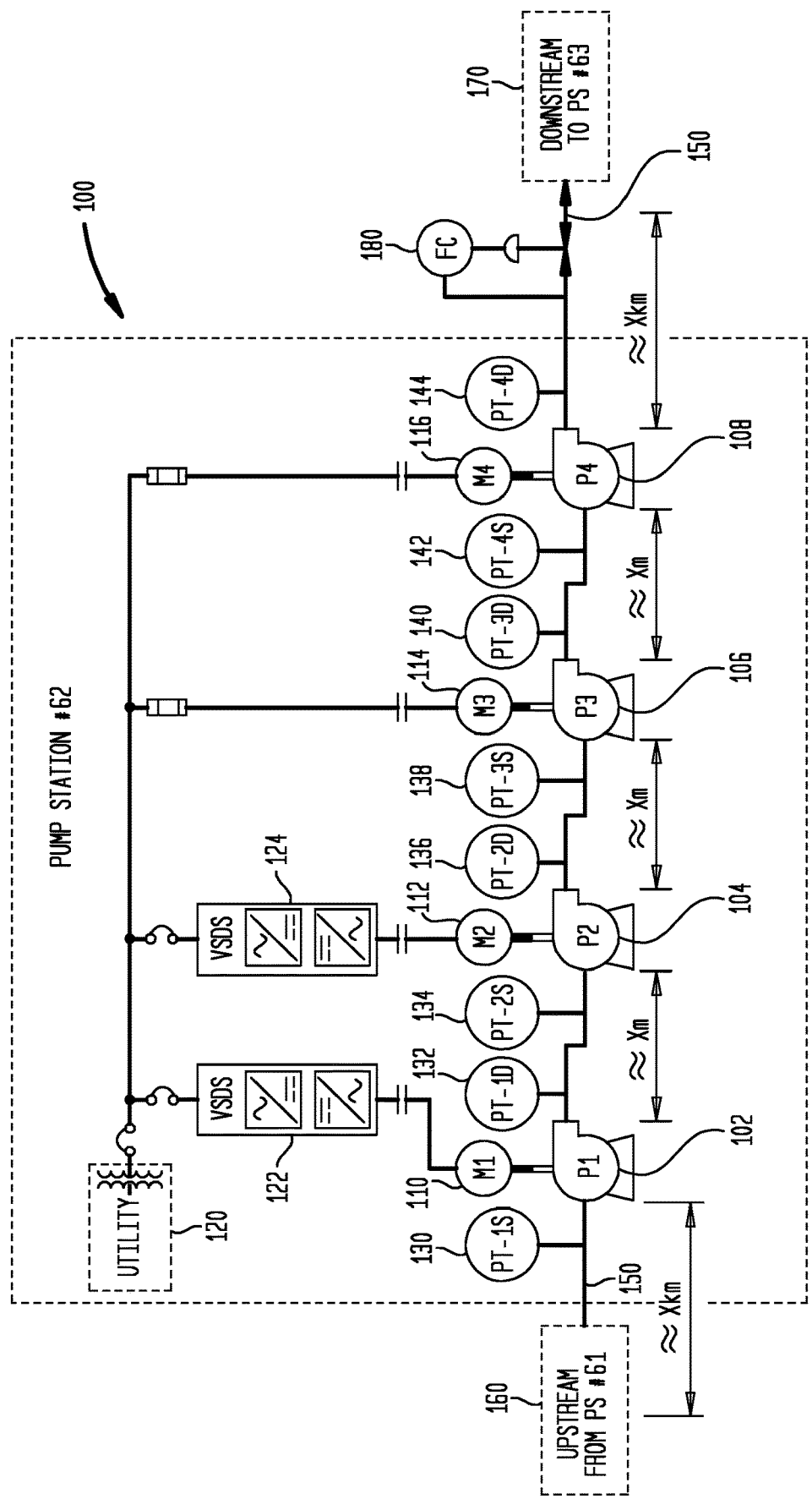
FIG. 1 illustrates an example pump station constructed in accordance with an exemplary embodiment of the present invention.

FIG. 1 illustrates an example pump station constructed in accordance with an exemplary embodiment of the present invention. While pumping stations are used for illustrative purposes of the disclosed techniques, the disclosed systems and methods are not limited to pumping station implementations.

The pump station 100 as illustrated in FIG. 1 models a four-pump-in-series-station with pumps 102, 104, 106, and 108, also labelled as P1, P2, P3, and P4, for transporting a liquid, for example oil, along pipeline 150. Many other media or liquids can be transported in the pipeline 150. Each pump 102, 104, 106, 108 is driven by an electric motor, which are for example induction motors. Pump 102 is driven by pump motor 110, also labelled M1, pump 104 is driven by pump motor 112 (M2), pump 106 is driven by pump motor 114 (M3), and pump 108 is driven by pump motor 116 (M4). For example, electrical power is supplied by power supply 120, also referred to as utility. Likewise, power supply can be by generator. If required, electrical transformers transform incoming voltage to appropriate levels for the pump motors 110, 112, 114, 116.

Pumps 102, 104, 106, 108 are each configured as a centrifugal pump. In this exemplary embodiment, the power for driving the pumps 102, 104, 106, 108 is provided directly by the electric pump motors 110, 112, 114, 116.

Pumps 102, 104 are powered each by a variable speed drive, also referred to as Variable Speed Drive System (VSDS). Pump 102 is powered by VSDS 122, and pump 104 is powered by VSDS 124. The variable speed drives 122, 124 are used to control speed and torque of pump motors 110, 112. In the exemplary embodiment according to FIG. 1, each VSDS 122, 124 is operated with a fixed speed set point. Pumps 106, 108 are operated at a constant speed powered from the utility 120. Optionally, the pump station 100 can be equipped with a flow controller 180.

Pumps 102 (P1) and 104 (P2), which are powered by VSDS 122 and 124, can be discharge pressure controlled using speeds of the motors 110 (M1) and 112 (M2). Thus, each pump 102, 104 comprises pressure sensors/transmitters 130, 132, 134, 136. Pressure transmitters 130, 132 monitor pressure head of pump 102, wherein pressure transmitter 130, also labelled as PT-1S, is arranged upstream of pump 102 and pressure transmitter 132, also labelled PT-1D, is arranged downstream of pump 102. Transmitter 132 is operably connected to VSDS 122 in order to control the discharge pressure of pump 102 using the speed of motor 110. As FIG. 1 shows, each further pump 104, 106, 108 comprises at least two pressure transmitters 134 (PT-2S), 136 (PT-2D), 138 (PT-3S), 140 (PT-3D), 142 (PT-4S), 144 (PT-4D), wherein one pressure transmitter is arranged upstream of the pumps 104, 106, 108 and one pressure transmitter is arranged downstream of the pumps 104, 106, 108. As described below, other sensors/transmitters can be associated with one or more of the pumps.

The four centrifugal pumps 102, 104, 106 and 108 of pump station 100 are arranged in series. One of ordinary skill in the art appreciates that pump station 100 can comprise more or less than four pumps, for example only one pump or ten pumps. When pump station 100 comprises more than one pump, the pumps can be arranged in series and/or in parallel and/or a combination of both.

The pump station 100 further comprises field devices to measure and monitor relevant data and manipulate operation. Such field devices comprise for example flow, pressure and temperature gauges, sensors, and transmitters. Pump station 100 can comprise pressure and temperature gauges and transmitters installed along the pipeline 150 on specific locations. A supervisory control and data acquisition system (SCADA) system, for example at a main control room, receives all the field data and presents the data to pipeline operators through a set of screens or other type of human-machine-interface, displaying the operational conditions of the pipeline. The operator can monitor the hydraulic conditions of the line, as well as send operational commands (open/close valves, turn on/off compressors or pumps, change set points, etc.) through the SCADA system to the field. Exemplary embodiments of the present invention integrate into such an operational environment, and, as described herein can be implemented using a PLC performing processes as disclosed herein.

The pump station 100 is labelled as pump station #62 and is part of a pump system. A pump system can comprise one ore pump stations, such as for example pump station 100 as illustrated in FIG. 1. As FIG. 1 shows, pump station 100 (#62) is connected between pump station 160 (#61) and pump station 170 (#63), wherein pump station 160 is located upstream of pump station 100 and pump station 170 is located downstream of pump station 100. Between the pump stations 100, 160 and 170 are distances of many kilometers. The distances between individual pump stations (X km) can vary, for example according to specific regional requirements. According to selected distances between pump stations, the number of individual pumps may need to be adjusted. For example, the longer the distance between pump stations, the more pumps at the pump station may be required in order to provide flow. Multiple pump stations, as for example pump stations 100, 160, 170, of a pump system can be arranged in series or parallel or in a combination of both. The pump stations 100, 160, 170 as schematically shown in FIG. 1 are arranged in series. Each pump of a pump system and/or each pump 102, 104, 106, 108 of a pump station such as pump station 100 can be either driven by a VSDS or can be powered directly by the utility 120, also referred to as direct online type (DOL). Each of the pumps 102, 104, 106, 108 can be operated on/off. When DOL operation of pumps 102, 104, 106, 108 is required, pumps 102, 104, 106, 108 are typically started using VSDs 122 and/or 124 to accelerate a pump to rated speed then transfer power to utility 120 after which VSDs 122 and/or 124 is/are disconnected from the pump and made available for use by the other pumps. Alternately, pumps 102, 104, 106, 108 can also be "across the line" started, with no accelerating with the VSD. Distances between individual pumps 102, 104, 106, 108 (X m) can be equal or can be different.

FIGS. 2A, 2B, 2C, and 2D illustrate examples of different pumping station electrical configurations for a utility to drive motors Mx and pumps Px of the pumping station. Other devices of the pumping system are omitted for clarity. While these are examples of common pumping station electrical configurations, disclosed techniques apply to other configurations. Unit control systems for the pipelines using such pumping stations can be designed and programmed to work with the power distribution single lines such as shown in A, B, C, and D.

Figure 2A:
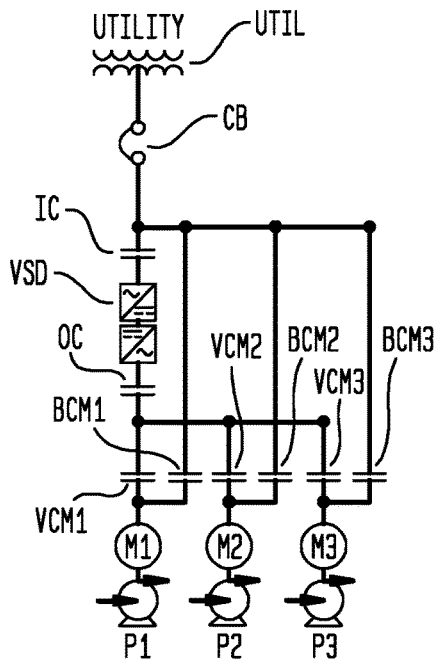
FIGS. 2A, 2B, 2C, and 2D illustrate examples of different pumping station electrical configurations for a utility to drive motors and pumps of a pumping station in accordance with disclosed embodiments.
Figure 2B:
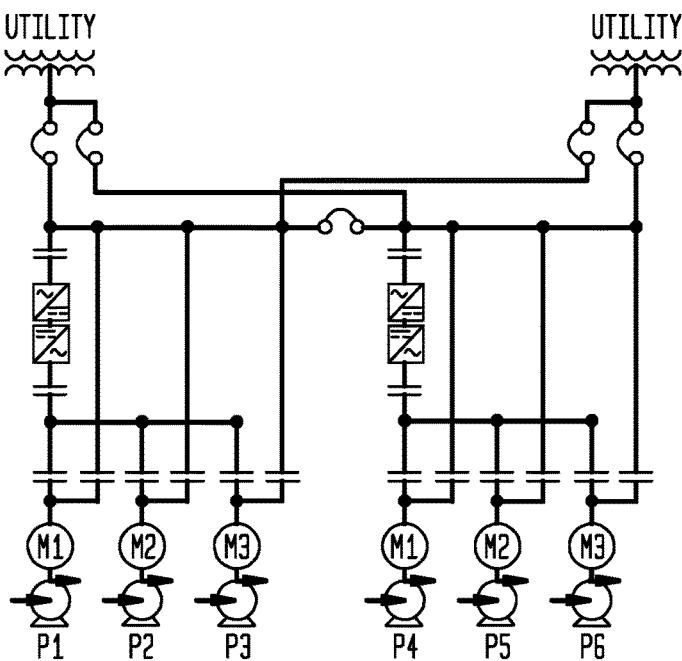
Figure 2C:
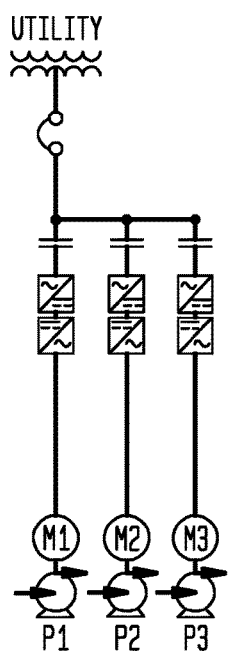
Figure 2D:
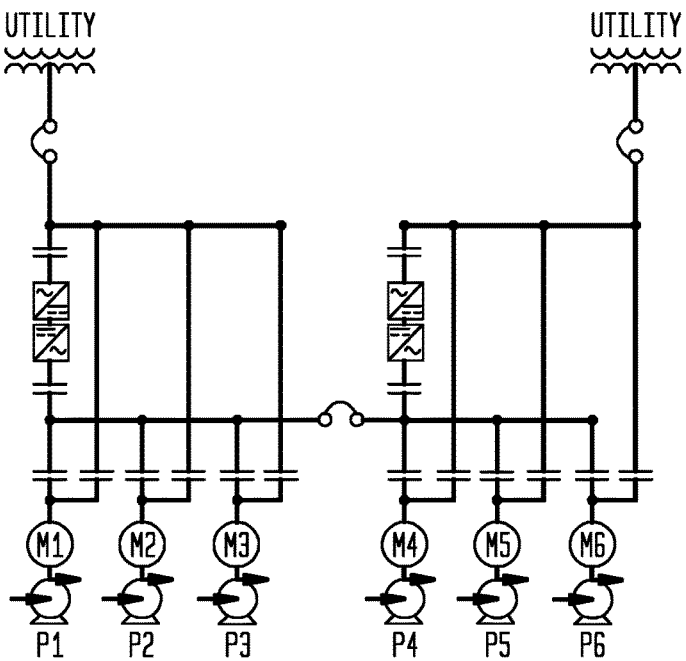

The example shown in FIG. 2A illustrates various elements of a pumping station, including Utility Substation UTIL, Incoming Feeder Breaker CB, VSD Input Contactor IC, Variable Speed Drive VSD, VSD Output Contactor OC, VSD-Motor1 Contactor VCM1, Bypass-Motor1 Contactor BCM1, Motor/Pump #1 M1, VSD-Motor2 Contactor VCM2, Bypass-Motor2 Contactor BCM2, Motor/Pump #1 M2, VSD-Motor3 Contactor VCM3, Bypass-Motor3 Contactor BCM3, and Motor/Pump #1 M3. Of course, these elements, the number of each element, and the connections between each element are for purposes of example only in the description herein, and are not limiting to disclosed embodiments. Some or all of the connections between the elements are switchable by the control system, and some or all of the elements have associated sensors that indicate status of the system, such as operational status or whether the element is powered. For clarity of illustration, the switches and sensors associated with each device are not shown here.

Power source and distribution arrangements (SLDs) can differ a great deal from one pipeline, pump station, or other facility to the next. Disclosed embodiments address issues related to the control system software and electrical configuration and control.

In some power systems, the unit control software is programmed with pipeline or pump station-specific logic to match the single line diagrams. Such a solution does not support the concept of an adaptable and configurable implementation that can adapt to many configurations and that can be deployed everywhere.

Disclosed embodiments can implement unit control processes for power sources that are able to support any single line-diagram and equipment arrangement. Disclosed embodiments can perform a generic electrical configuration and control process that can be stored, for example, as executable instructions in a global core library in a unified system.

Disclosed embodiments implement an efficient process for electrical configuration by using an adjacency matrix and a health matrix to determine which motors can be powered by which drives or bypass contactors and by which power source such as substation X or substation Y.

Power distribution systems such as those in FIGS. 2A-2D can be represented by a square matrix in accordance with disclosed embodiments.

Figure 3:
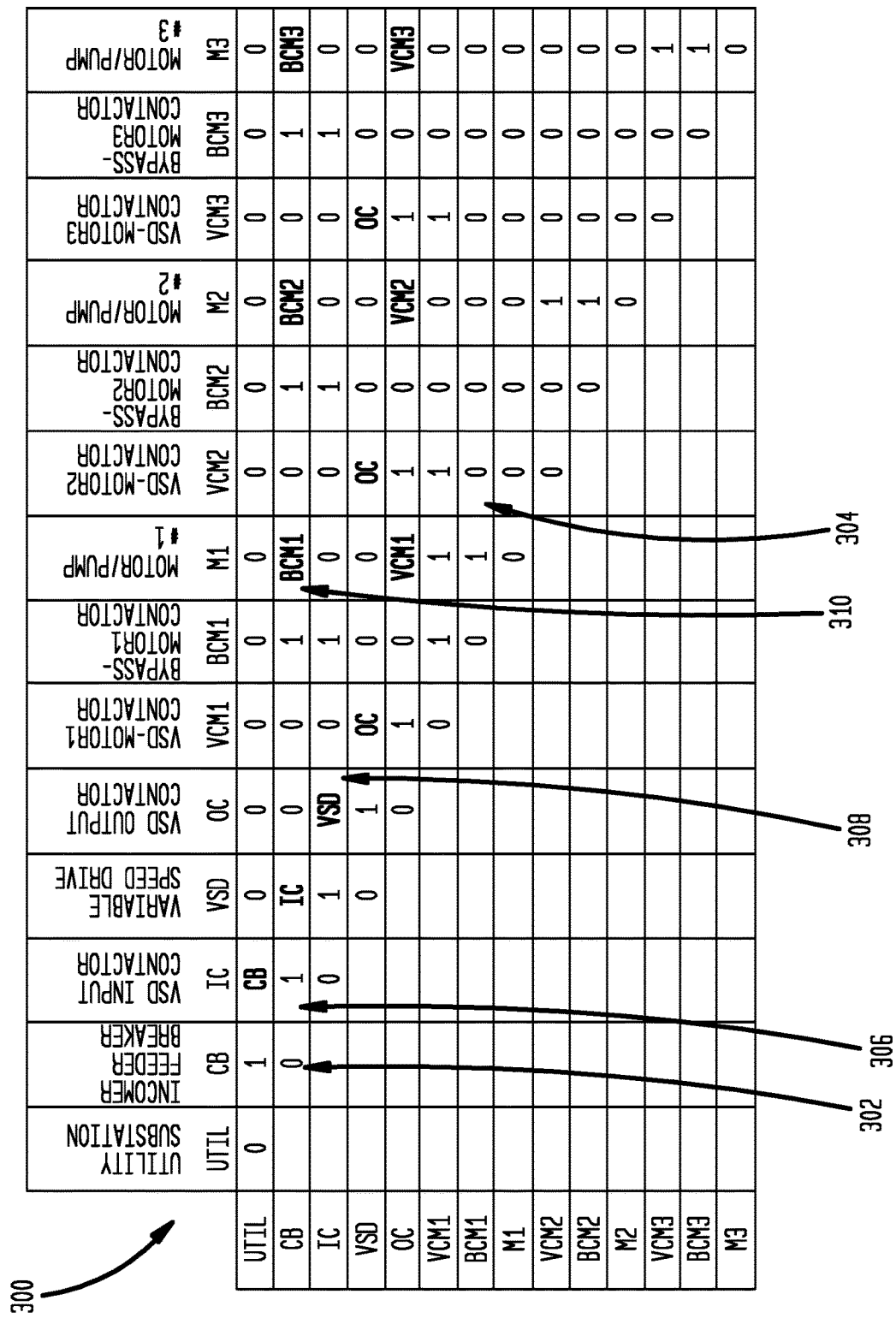
FIG. 3 illustrates an adjacency matrix in accordance with disclosed embodiments.

FIG. 3 illustrates a 14×14 adjacency matrix 300 in accordance with disclosed embodiments, using FIG. 2A as an example and the labels/abbreviations used above. The size of a given adjacency matrix is determined by number of pieces of equipment; for example, in a pumping station implementation, this includes transformers, incoming breakers, VSD input contactors, VSDs, VSD output contacts, all the VDS motor contactors, all the bypass contactors, and all the motors, etc. In FIG. 2A, there are 14 elements, any of which can be healthy/operational or out of service, and some or all of which can be switchable to connect to adjacent elements. The adjacency matrix represents connections (whether permanent or switchable) between each of the various elements.

The system can produce the adjacency matrix from an input configuration file that describes the elements and the connections between them. Such an input configuration file can be, for example, a spreadsheet, a comma-separated-value (CSV) file, a netlist, or any other format that includes the elements that define the rows/columns and the connections (whether switchable or hard-wired) between respective elements. In this example, the configuration file describes elements as the power station equipment as described above, but the configuration file can include any elements to be configured as described herein for any plant, station, or other facility.

Such an adjacency matrix is diagonal, as the connection between any two elements need only be represented once in storage. The equipment in the diagram can be listed in any order for the rows of the adjacency matrix, and that order is duplicated in the columns of the adjacency matrix.

The adjacency matrix identifies the possible paths power can flow (or not) from one device to another. To populate the cells in the matrix, the system defines all diagonal cells as value 0 because a device can't connect to itself. For example, cell 302 is value 0 since the incoming feeder breaker CB cannot be connected to itself to supply power. Only one-half of the cells need to be populated (the matrix is diagonal). A cell value of 0 is also defined for cells where there is no possibility of a row device directly connecting to a column device. For example, cell 304 is value 0, indicating that bypass-motor1 contactor BCM1 cannot connect to VSD motor2 contactor VCM2 to supply power.

A cell value of 1 is defined in the matrix for hard connections such between two devices. For example, the bus bar from the load side of the feeder breaker to the top of the VSD input contactor, as in FIG. 2A, is represented as a cell value of 1 in cell 306 between incomer feeder breaker BC and VSD input contactor IC.

A cell value is defined using a device identifier (such as CB or VCM2_when a device (such as a contactor) that connects two adjacent devices. For example, cell 308 has a value of "VSD," indicating that VSD input contactor IC can be connected to supply power to VSD output contactor OC through variable speed drive VSD. The VSD could be considered to be such a device; however, power flow is only in one direction so even though the VSD "could" connect a motor bypass contactor, the cell entry is 0 because power can't flow from the out of rectifier's input through the VSD input contact to the motor bypass contactor.

The device identifiers are used as variables by the system. These variables represent the availability of the device to be used to start a pump, transfer a pump running on the VSD to bypass (up-sync), or to transfer a pump running on bypass to the VSD (down-sync). If a contactor is removed ("racked out"), the protection relay indicates a fault, or the connection is otherwise unavailable, the value for the variable is 0. If a contactor is in place ("racked in") and is ready, the value for the variable is 1. If the VSD is ready and not running, the variable value is 1; if faulted, the variable value is zero.

That is, in the context of the example of FIG. 3, cell 310 shows that bypass motor 1 contactor BCM1 can supply power to motor/pump #1 M1 from incoming feeder breaker CB, by putting variable BCM1 in cell 310. If the bypass motor1 contactor BCM1 is racked out, the value of variable BCM1 is set to 0, so that the value of cell 310 indicates that there is no power connection available between incoming feeder breaker CB and motor/pump #1 M1.

Note that the values of "0" and "1" in this example are arbitrary, and can be generally referred to as a "disconnect value" (indicating no connection is available between the elements corresponding to the cell) and a "connect value" (indicating a connection is available between the elements corresponding to the cell, whether permanent or switchable).

To determine if a pump can be started, the system determines a path through the adjacency matrix for power to travel from the substation to flow to the motor.

The values in the cells that link the motors to the utility are zero in the adjacency matrix example of FIG. 3, which indicates that the pumps cannot be started by a direct connection to the power utility.

Figure 4A:
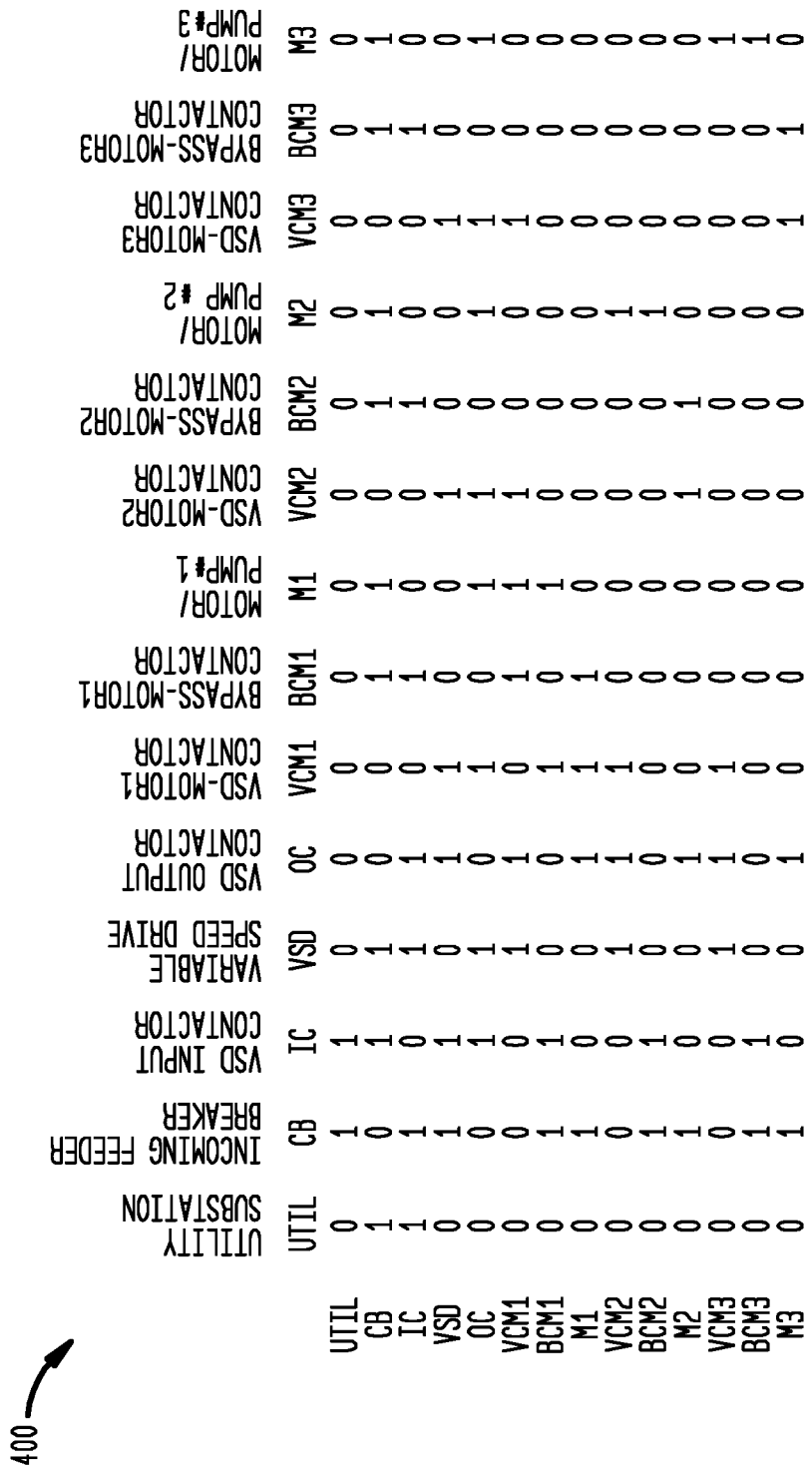
FIG. 4A illustrates a matrix A corresponding to FIG. 2A and FIG. 3, in accordance with disclosed embodiments.

Matrix multiplication can be used to determine if a path is available, by multiplying the matrix by itself a number of times, up to the size of the matrix. For example, FIG. 4A illustrates a 14×14 matrix A (also denoted as $A^1$) 400 corresponding to FIG. 3 (and FIG. 2A) that can be multiplied by itself up to $A^{14}$. Some or all of the cells are evaluated after each multiplication; any result greater than 0 means all the equipment necessary to start the pump is available or connected. If, after the maximum number of multiplications, the result for each was 0, then one or more pieces of equipment aren't available and the pump can't be started.

In this example, FIG. 4A is completely filled rather than half/diagonally filled to illustrate the multiplication, and all variable entries (such as BCM1) are replaced with a 1 value. Adjacency matrix A shows direct power connections between two devices, where a 0 entry indicates no direct connections.

Figure 4B:
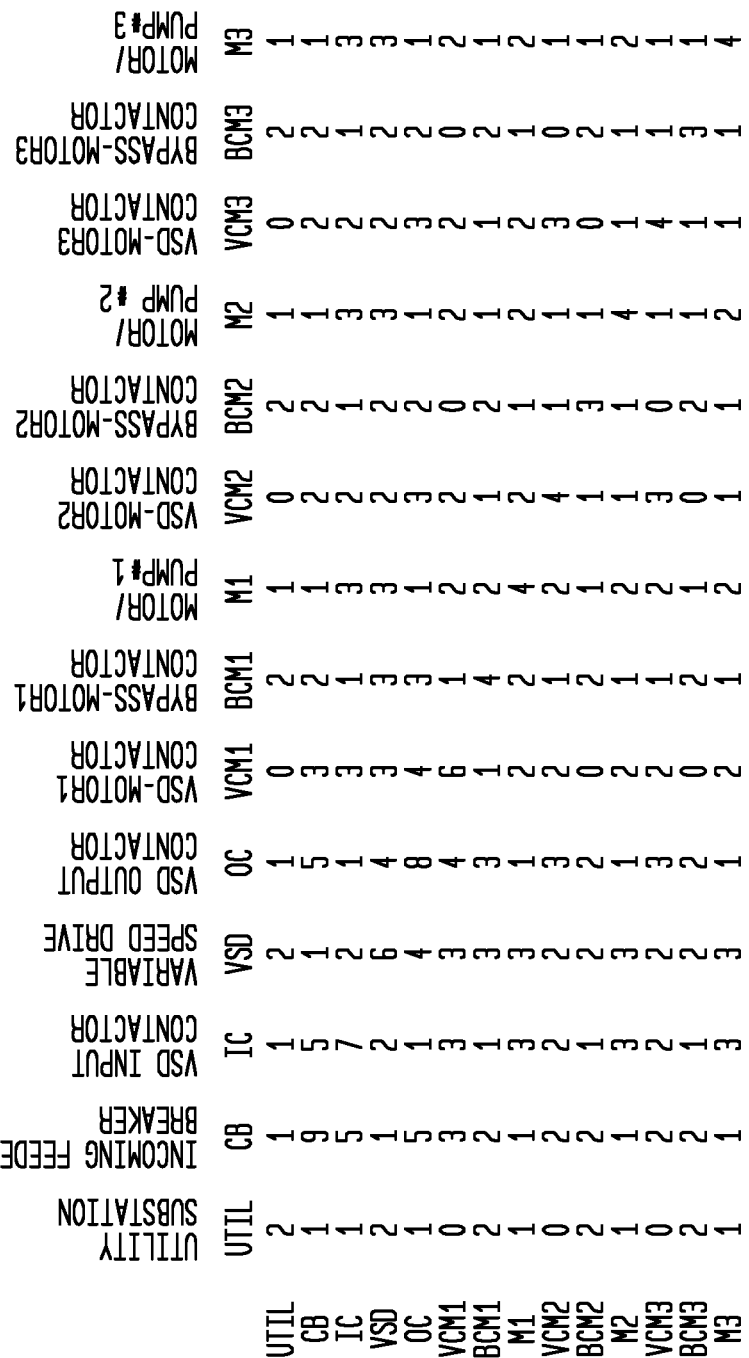
FIG. 4B illustrates a matrix $A^2$ corresponding to FIG. 3 as the square of matrix A of FIG. 4A, in accordance with disclosed embodiments.

FIG. 4B illustrates a 14×14 matrix $A^2$ corresponding to FIG. 3 as the square of matrix A of FIG. 4A. Any non-0 cell entry indicates that there is a power connection available within two "steps" between devices. A 0 cell entry indicates that there is no power connection available within two "steps" between devices. Note that the cell intersection between UTIL and VCM2 is 0 in both A and $A^2$.

Figure 4C:
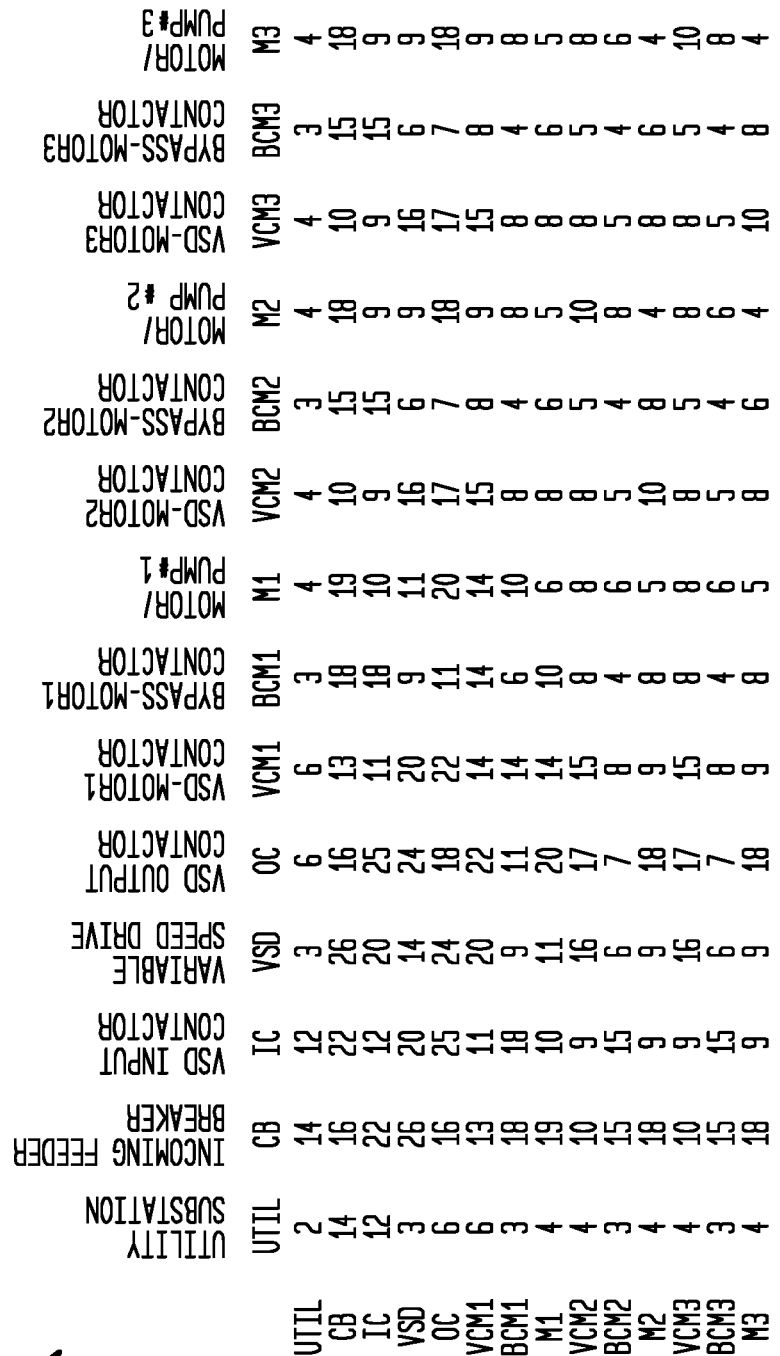
FIG. 4C illustrates a matrix $A^3$ corresponding to FIG. 3 as the cube of matrix A of FIG. 4A, in accordance with disclosed embodiments.

FIG. 4C illustrates a 14×14 matrix $A^3$ corresponding to FIG. 3 as the cube of matrix A of FIG. 4A. Any non-0 cell entry indicates that there is a power connection available within three "steps" between devices. A 0 cell entry indicates that there is no power connection available within three "steps" between devices. Note that the cell intersection between UTIL and VCM2 is now a non-0 value, so there is a power connection possible between UTIL and VCM2 within three "steps."

Similar matrices are computed for $A^4$-$A^{14}$. These matrix multiplications are performed on an occasional, repeated, or continual basis to determine if connections are available between any two devices. For computational efficiency, multiplication can be triggered by a change in status of any device. If no device's status changes the multiplication need not be performed. Any cell value that remains 0 through all matrices $A^1$-$A^{14}$ indicates that no connection is possible at all between those devices. Most importantly, any cell value that remains 0 for a connection to the power source(s) (UTIL in this example) cannot be powered at all.

These matrices are continued to be updated to accommodate changes in variable values as describe above, or to accommodate changes in health values as described herein. That is, for example, if the VSD fails, then while there may be power at the VSD input contactor IC, there will not be power at the VSD output contactor OC, and the VSD variable as shown in FIG. 3 will be updated to 0 for the next update of the adjacency matrixs.

The system also maintains the status of each of the elements of the system being controlled, for example each of the elements shown in FIG. 2A. The status can be maintained in a table or other structure, generally referred to here as a health table. While the health table can include any status information for each of the elements, for purposes of this example the health table stores the power status (power available or unavailable) for each element. The power status can be, for example, a 1 for a device that is receiving attached power, and a 0 for a device that is not receiving power (or is inoperable, removed, or racked out). The power status can be used to control the variables in the adjacency matrix, so that a variable representing a device that is not receiving power is also set to 0 and a variable representing a device that is receiving power is set to 1.

FIG. 5 illustrates a health table 500 corresponding to FIG. 2A and the adjacency matrix 300 of FIG. 3, illustrating status information for each of the elements of that example. This health table example, for each element, stores power status (whether or not it is connected to receive power), operational status (whether or not it is operating, whether powered or not), and electrical load.

Note that, in this example, referring to health table 500 and adjacency matrix 300, M1 is powered by VCM1 (which is powered and operational) and not BCM1 (which is unpowered). M2 is powered by BCM2 (powered) and not VCM2 (unpowered). M3 is not powered, since both VCM3 and BCM3 are unpowered.

By using this information, the control system for the pumping station can, for example, determine how to control M3, by switching on VCM3 or BCM3 (depending on whether variable or bypass power is required) to power M3.

Devices and equipment as illustrated in the single line diagrams of FIGS. 2A-2D are represented by generic "availability" objects in the program. The availability objects property values such as ready, available etc. are set by the status signal of the equipment. Configuring the unified unit control system for any power system and distribution is a simple matter of processing the configuration file described herein and building the adjacency matrix which represents the power system. With this implementation, station specific programming is not required, rather, the control system can read the configuration file, build the adjacency matrix, perform any matrix multiplication, monitor the power status of any of the elements of the adjacency matrix, and operate switches of the system to power any device without location-specific programming.

Figure 6:
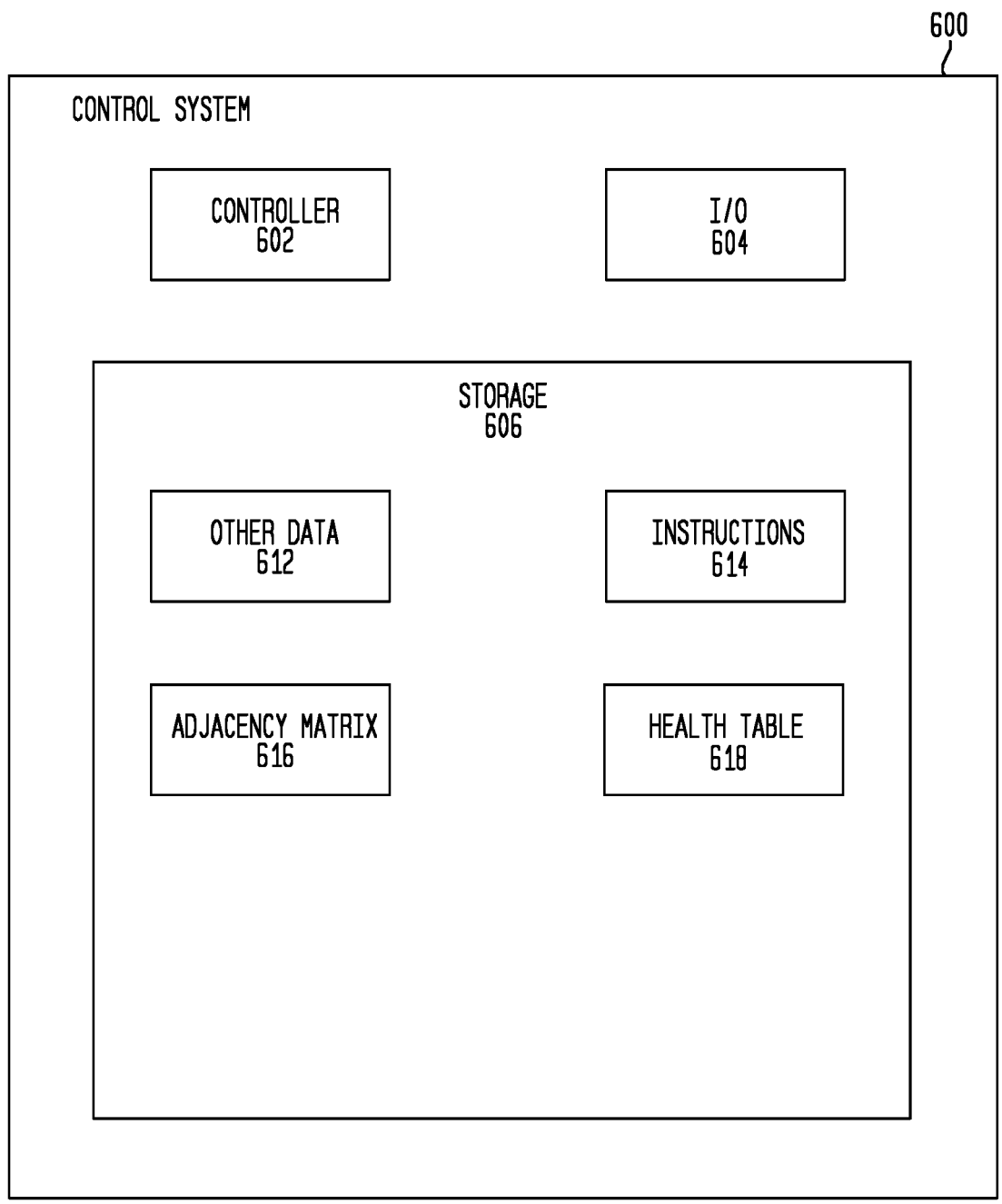
FIG. 6 illustrates an example of a control system in accordance with disclosed embodiments.

FIG. 6 illustrates an example of a control system 600 in accordance with disclosed embodiments. In the example above, control system 600 is part of a pumping station control system, but can be implemented as part of a control system of any system for which automatic configuration and control is useful. For example, the techniques described herein can be used in a fluid distribution system, where the elements in the adjacency matrix and health table are elements to which fluids can be delivered, and instead of switching electricity, valves for the liquid distribution are switched on or off.

In specific embodiments, the control system 600 is implemented using one or more PLCs. In other embodiments, the control system 600 can be implemented as a cloud application and results sent back to the station or other facility being monitored and controlled. Similarly, calculations and models performed at the facility can be sent to cloud applications for further calculations.

Control system 600 includes a controller 602 and an input/output (I/O) unit 604. I/O unit 604 can include any necessary hardware to communicate with other devices, including physical connections, network interfaces (wired and/or wireless), display outputs, HMI inputs and outputs, and other devices, or appropriate connections to communicate with any such external devices to perform processes as disclosed herein, and in particular to communicate with, monitor, and control devices of a pump station 100 or other facility as described herein.

Control system 600 also includes a storage 606 that can include any combination of transitory and non-transitory computer-readable media, including but not limited to random-access memories (RAMs) or nonvolatile, hard-coded type mediums such as read only memories (ROMs) or erasable, electrically programmable read only memories (EEPROMs) or any other known storage or memory device. This can include external devices such as magnetic tape storage, and user-recordable type mediums such as floppy disks, hard disk drives and compact disk read only memories (CD-ROMs) or digital versatile disks (DVDs), and other known optical, electrical, or magnetic storage devices. Storage 606 can also include Internet of Things (IoT) and Cloud storage services.

The storage 606 can include executable instructions 614 to perform any of the processes as described herein or to otherwise monitor and control devices of a pump station 100 or other facility as described herein. These instructions, when executed, cause the control system to perform the processes or specific actions described herein. Storage 606 can also include adjacency matrix (or matrices) 616, which can include any data for the various pumps, such as specification data, current or historical operation data, predictive data, or other data for one or more of the pumps. Storage 606 can also include health table 618, which can include any of the status information as discussed herein. Storage 606 can also include other data 612, which generally includes any other data useful for performing processes as described herein or otherwise monitor, communicate with, and control devices of a pump station 100 or other facility as described herein, including any configuration file(s) as discussed above.

FIG. 7 illustrates a process as disclosed herein to control a distribution system as disclosed herein. This specific example is described in terms of electrical distribution of a pumping station as in the example above, but these processes can be used in any distribution system such as for electricity or liquid, and is generally referred to as the "system" below. These processes can be performed by a control system as described herein, referred to generically as the "control system" below.

The control system receives a configuration file that defines elements of the system to be controlled and connections between the elements (702).

The control system builds an adjacency matrix corresponding to the configuration file (704). The adjacency matrix defines the elements of the system to be controlled and the connections between the elements, where each cell of the matrix identifies whether two elements are connected to each other. A cell of the matrix can include a variable dependent on the status of another element. "Connected to each other," depending on the nature of the system being controlled, can include connected to deliver power to each other, connected to deliver fluid to each other, or otherwise.

The control system monitors the status of the elements of the system (706). The status can include any of the factors discussed above, including whether each element is currently powered.

The control system builds or updates a health table based on the status of elements of the system (708). The control system can repeat or otherwise loop between 706 and 708 to keep the health table updated with the status of the elements, and can do so while performing other processes.

The system identifies a first element of the system that is to be powered (710). Of course, powered refers to electrical-distribution control, and in other embodiments, the system identifies the element of the system that is to receive a liquid, for example. The first element can be identified by receiving a user input of the first element, by determining from the condition of the system that the first element should be powered, or otherwise.

The system determines "connected elements" of the system, among the elements of the system, that are connected to deliver power to the first element, based on the adjacency matrix (712). As described above, the system can determine elements that are directly connected to the first element according to the adjacency matrix itself, including evaluating any variables in the adjacency matrix, and can determine elements that are indirectly connected to the first element by calculating matrix powers of the adjacency matrix (that is, for adjacency matrix A, calculating matrices $A^1$-$A^N$, where N is the number of elements in the adjacency matrix).

The system identifies one or more of the elements of the system to activate, based on the health table, the adjacency matrix, and the connected elements, to deliver power to the first element (714). This can be performed, for example, identifying a connected element that has power according to the health table, and finding a path through the elements from the connected element to the first element. The path can be found using any known technique for graph or node traversal, including but not limited to random walk algorithms. The system can also determine a shortest path among many identified paths, or can determine a path that ensures that an electrical load or fluid volume along the part or on any element does not exceed a predetermined threshold.

The system activates the one or more identified the elements (716). This can include, for example, activating a switch at one or more of the elements, turning on one or more of the elements, or performing other physical configuration changes to the elements of the system to change the flow of electricity, liquid, etc. The process can loop back to 706 to continue monitoring element status and performing other processes as described herein.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all systems suitable for use with the present disclosure is not being depicted or described herein. Instead, only so much of a data processing system as is unique to the present disclosure or necessary for an understanding of the present disclosure is depicted and described. The remainder of the construction and operation of the systems and devices disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method for controlling electrical activation of elements in a system, comprising:
   identifying a first element of a system by a control system, among a plurality of elements of the system, that is to be powered;
   determining connected elements among the elements of the system by the control system, the connected elements connected to deliver power to the first element directly or indirectly, based on an adjacency matrix, wherein the adjacency matrix identifies connections between each of plurality of elements of the system;
   identifying at least one of the connected elements to activate by the control system, based on the adjacency matrix, a health table indicating a status of the elements, and the connected elements, to deliver power to the first element;
   activating the at least one of the connected elements by the control system, thereby delivering power to the first element, wherein activating includes activating a switch at the at least one of the connected elements, turning on at least one of the connected elements, or performing other physical configuration changes to the at least one of the connected elements to change a flow of electricity and/or liquid regarding the first element,
   wherein the system is a pumping station, and wherein the first element is a pump in a pumping station,
   wherein the pump is connected to be driven by an electric motor,
   wherein the activating of the at least one of the connected elements by the control system to deliver power is configured based on the adjacency matrix to perform one of the following types of pump activation: a direct online (DOL) activation by way of directly connecting the electric motor to a utility, and a variable speed activation by way of connecting the motor to a variable speed drive (VSD).

2. The method of claim 1, further comprising:
   receiving a configuration file that defines the plurality of elements of the system and connections between the plurality of elements; and
   building the adjacency matrix according to the configuration file, wherein each cell of the adjacency matrix identifies whether a respective two of the plurality of elements of the system are connected to each other.

3. The method of claim 1, wherein one or more cells of the adjacency matrix includes a variable dependent on the status of another element.

4. The method of claim 1, further comprising:
   monitoring the status of each of the plurality of elements; and
   updating the health table based on the status of each of the plurality of elements,
   wherein the status includes whether each element is currently powered.

5. The method of claim 4, wherein monitoring the status of each of the plurality of elements and updating the health table is performed repeatedly.

6. The method of claim 1, wherein determining connected elements of the system by the control system includes determining elements of the system that are indirectly connected to the first element by calculating matrix powers $A^1$-$A^N$ of the adjacency matrix, wherein A represents the adjacency matrix and N is the number of the plurality of elements.

7. The method of claim 1, wherein identifying at least one of the connected elements to activate by the control system includes, identifying a connected element that has power according to the health table, and finding a path through the elements from the connected element to the first element.

8. A control system for controlling electrical activation of elements in a system, comprising:
   a memory; and
   a controller in communication with the memory, wherein the controller is configured to:
   identify a first element of a system, among a plurality of elements of the system, that is to be powered;
   determine connected elements among the elements of the system, the connected elements connected to deliver power to the first element directly or indirectly, based on an adjacency matrix, wherein the adjacency matrix identifies connections between each of plurality of elements of the system;
   identify at least one of the connected elements to activate, based on the adjacency matrix, a health table indicating a status of the elements, and the connected elements, to deliver power to the first element;
   activate the at least one of the connected elements, thereby delivering power to the first element, wherein activating includes activating a switch at the at least one of the connected elements, turning on at least one of the connected elements, or performing other physical configuration changes to the at least one of the connected elements to change a flow of electricity and/or liquid regarding the first element;
   wherein the system is a pumping station, and wherein the first element is a pump in a pumping station,
   wherein the pump is connected to be driven by an electric motor, wherein the activating of the at least one of the connected elements by the control system to deliver power to the pump is configured based on the adjacency matrix to perform one of the following types of pump activation: a direct online (DOL) activation by way of directly connecting the motor to a utility, and a variable speed activation by way of connecting the motor to a variable speed drive (VSD).

9. The control system of claim 8, wherein the control system is further configured to:
receive a configuration file that defines the plurality of elements of the system and connections between the plurality of elements; and build the adjacency matrix according to the configuration file, wherein each cell of the adjacency matrix identifies whether a respective two of the plurality of elements of the system are connected to each other.

10. The control system of claim 8, wherein one or more cells of the adjacency matrix includes a variable dependent on the status of another element.

11. The control system of claim 8, wherein the control system is further configured to:
monitor the status of each of the plurality of elements; and update the health table based on the status of each of the plurality of elements, wherein the status includes whether each element is currently powered.

12. The control system of claim 11, wherein monitoring the status of each of the plurality of elements and updating the health table is performed repeatedly.

13. The control system of claim 8, wherein determining connected elements of the system by the control system includes determining elements of the system that are indirectly connected to the first element by calculating matrix powers $A^1$-$A^N$ of the adjacency matrix, wherein A represents the adjacency matrix and N is the number of the plurality of elements.

14. The control system of claim 8, wherein identifying at least one of the connected elements to activate by the control system includes, identifying a connected element that has power according to the health table, and finding a path through the elements from the connected element to the first element.

15. The control system of claim 8, wherein the first element is identified by receiving a user input of the first element.

* * * * *